April 29, 1958 K. MACLEOD 2,832,227

ROTATABLE DRIVE MECHANISM

Filed Sept. 13, 1954 2 Sheets-Sheet 1

KEITH MAC LEOD,
INVENTOR.
HUEBNER, BEEHLER,
WORREL & HERZIG,
ATTORNEYS.
BY Warren T. Jessup KEITH MAC LEOD,
INVENTOR.
HUEBNER, BEEHLER,
WORREL & HERZIG,
ATTORNEYS.
BY Warren T. Jessup 2,832,227
Patented Apr. 29, 1958

2,832,227

ROTATABLE DRIVE MECHANISM

Keith Macleod, Santa Barbara, Calif.

Application September 13, 1954, Serial No. 455,719
7 Claims. (Cl. 74—209)

This invention relates to rotatable drive mechanisms, and more particularly to a phonograph turntable drive mechanism.

With the growing popularity of high fidelity music reproduction by means of phonograph records, the problems of turntable vibration have become increasingly important. Previously, when the inherent fidelity of the record and reproducing mechanism was low, vibration, particularly high frequency vibration transmitted to the turntable from the driving motor, was of no particular importance. However, with the present advent of high fidelity reproduction it becomes increasingly important to prevent vibration of the driving motor, and other vibration, from being transmitted to the turntable on which the record is turned.

It is an object of this invention to provide improved means for attenuating vibration which might otherwise be transmitted from the driving motor to the turntable.

It is another object of this invention to provide a means for rotatably driving a pivotally mounted cylinder, such as a record turntable, which means is substantially free of vibration transmitted to the turntable.

It is another object of this invention to provide such a vibration attenuating means which is of simple and inexpensive construction, and which readily adapts itself for a declutching operation, whereby the turntable may be quickly and easily disengaged from the drive motor.

It is a further object of this invention to provide a simple, inexpensive and readily manipulated means for adjusting the speed ratio of the coupling between the drive motor and the record player turntable, whereby different record speeds may be readily attained by a single phonograph turntable.

In accordance with these and other objects which will become apparent hereinafter, a preferred form of the present invention is illustrated in the accompanying drawings wherein.

Figures 1, 2, 5:
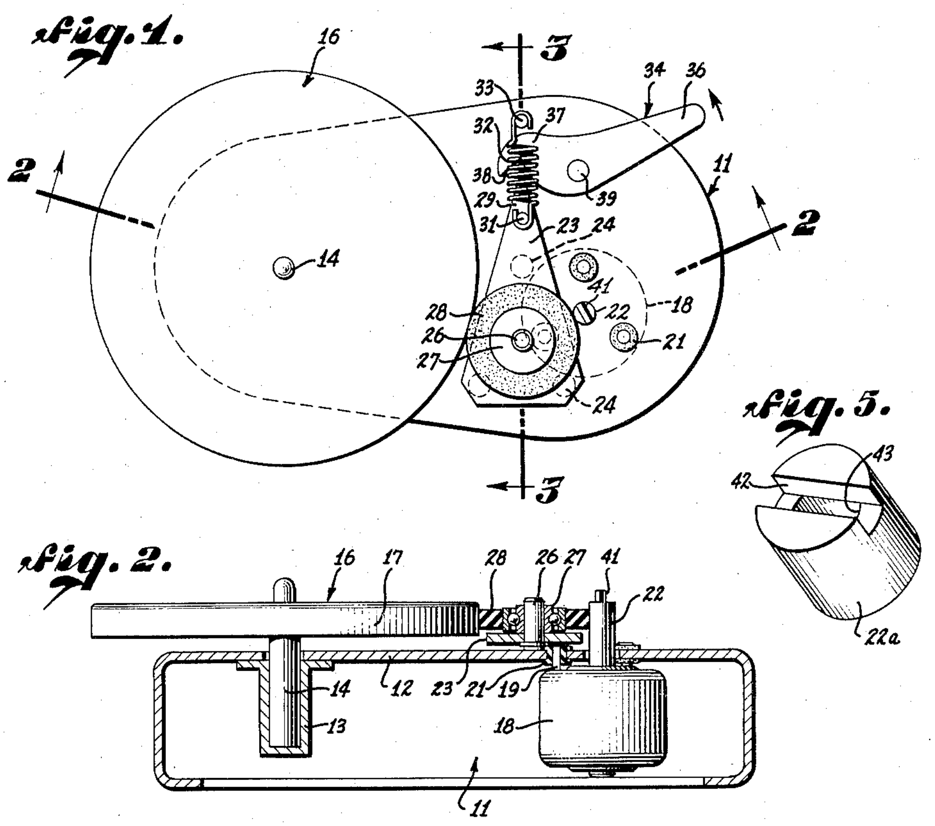
Fig. 1 is a plan view looking down on a phonograph turntable driving mechanism constructed in accordance with the present invention.
Fig. 2 is a vertical section taken on the angled section line 2—2 in Fig. 1.
Fig. 5 is a fragmentary perspective showing one of the rollers employed for obtaining adjustable speed for the turntable.
Figure 3:
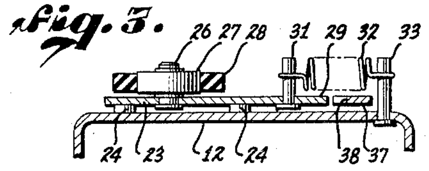
Fig. 3 is a cross section taken on the line 3—3 in Fig. 1.
Figure 6:
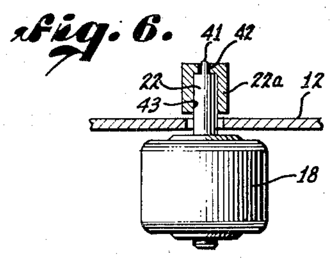
Fig. 6 is a fragmentary cross section showing the roller of Fig. 5 mounted on the shaft of the drive motor.

Referring to the drawing, 11 designates a phonograph frame, which includes a first member in the form of a substantially flat horizontal platform or base 12. At one side of the base 12 there is provided a shaft-receiving well 13 in which is pivotally mounted a shaft 14. Secured to the shaft 14 above the base 12 is a cylindrical body in the form of a record player turntable 16 having a downwardly extending cylindrical flange 17.

At the other side of the base 12, and disposed therebeneath, is an electric drive motor 18 secured pendent beneath the base by a plurality of mounting pins or rivets 19. The pins 19 pass through pliant, resilient, vibration damping grommets 21 (made, for example, of rubber) in the base 12, which thus constitute vibration attenuating or absorbing mounting means for the motor 18. This means, in the form of the grommets 21, substantially damps or attenuates transmission of vibrations from the motor 18 to the platform or base 12. The shaft 22 of the motor 18 extends upwardly through the base 12 to constitute a drive cylinder or roller.

Disposed between the turntable 16 and the drive roller 22 is a second or carrier member in the form of a triangular plate 23. Beneath the plate 23 and preferably bonded thereto is pliant pad means in the form of a plurality of pliant, vibration damping discs made, for example, of sponge rubber, felt, or the like. The carrier plate 23 rests on and is supported by the base 12 through the intermediacy of the pliant vibration absorbing means in the form of the discs 24, which are thus slidable with respect to at least one of the members 12, 23, in the specific example shown, this being the base member 12.

Rotatably mounted to the carrier plate 23 by means of an upstanding stub shaft 26 and a bearing 27, is an idler roller, or wheel 28 having a rim of pliant, vibration absorbing or damping material such as rubber or an equivalent substance. The outer diameter of the wheel 28 is somewhat larger than the minimum distance between the turntable flange 17 and the shaft 22, so that when the plate 23 is biased in the proper direction, the wheel 28 is brought into driving engagement with the turntable 16 and the drive roller or shaft 22. The turntable 16 is thus driven from the shaft 22 through the intermediacy of the idler wheel 28.

The pliant rim constitutes an appreciable portion of the wheel 28, thereby providing not only a frictional driving surface to the turntable and to the shaft, but also a further vibration damping link between the drive motor 18 and the turntable 16. Thus vibrations are further attenuated, and do not reach the turntable 16.

As best seen in Fig. 1, the triangular plate 23 is so disposed that one of its corners or points 29 is directed generally transversely away from the line of engagement between the roller and the turntable. Adjacent this point 29 on the plate 23 is an upstanding mounting pin 31 over which is hooked a tension spring 32, the other end of which is hooked over a mounting pin 33 upstanding from the base 12. The spring 32 thus resiliently biases the idler wheel 28 into driving engagement with and between the roller 22 and turntable 16. The spring 32 in addition to providing a resilient bias for urging the idler wheel 28 into driving engagement, also constitutes a vibration absorbing or attenuating means which further absorbs motor vibration.

Figure 4:
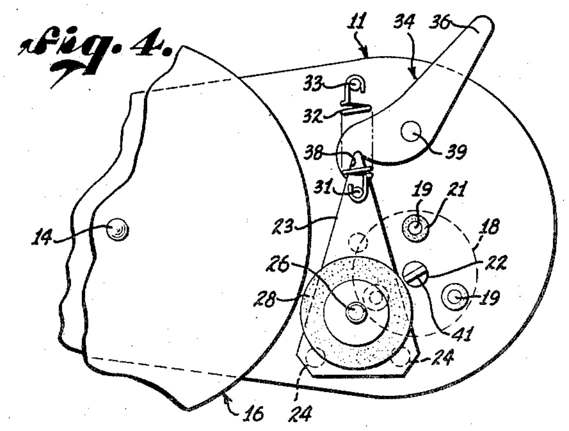
Fig. 4 is a fragmentary plan similar to Fig. 1 showing the parts in a different attitude.

In accordance with the present invention, the vibration absorbing drive link, described hereinbefore, is uniquely adapted for providing a declutching arrangement in which the turntable 16 may be readily declutched from the driving roller 22. Such a declutching arrangement includes a disengaging lever 34 including a handle portion 36 and a notch portion 37 having a notch 38 disposed in position to engage the pointed corner 29 of the triangular carrier plate 23. The lever 34 is pivoted to the base 12 by an upstanding pivot pin 39. When the lever 34 is pivoted counterclockwise in Fig. 1, the notch 38 is brought into engagement with the point 29, forcing the carrier plate 23 away from the turntable 16 and drive roller 22, against the tension bias of the spring 32, as shown in Fig. 4. In this position of the parts the turntable 16 may be brought to rest without deenergizing the driving motor 18.

The disengaging lever 34 also fulfills another valuable function, and that is to provide a means for readily changing the turning speed of the turntable 16. As explained hereinbefore, the shaft 22 of the motor 18, as shown in Fig. 2, constitutes a driving roller for the turntable 16 through the intermediacy of the idler wheel 28. As will be readily evident, the speed of the turntable 16 is directly dependent upon the diameter of the driving roller 22. The larger the diameter of 22, the higher will be the turntable speed.

In order to provide adjustable speeds for the turntable 16, a plurality of different size drive rollers 22*a* may be provided, which are readily and selectively mountable to and over the drive shaft 22, in order to make the effective diameter of the drive roller larger. The separate rollers 22*a* are coupled to the shaft 22 by providing the shaft 22 at its upper end with a flat nib 41, which engages in a diametric kerf 42 formed in the upper end of each roller 22*a* and communicating with the hollow bore 43 in the roller.

By retracting the idler wheel 28 through operation of the lever 34, the user may mount a roller 22*a* over the shaft 22 with the nib 41 engaged in the kerf 42, thereby to adjust the speed of the turntable 16 to any desired value dependent upon the outer diameter of the roller 22*a*.

Vibrations originating in the motor 18 might be transmitted to the phonograph record on the turntable 16 principally by the following paths: first, from the motor 18 to the frame 12, then through the bearing 13 and shaft 14 to the turntable 16; second, from the motor 18 through the frame 12 to the plate 23, thence through the shaft 26 and wheel 28 to the turntable 16; third, from the motor 18 through its shaft 22 to the idler wheel 28 and thence to the turntable 16; fourth, from the motor 18 through its shaft 22 to the idler wheel 28, thence to the shaft 26, plate 23, frame 12, bearing 13, shaft 14 to the turntable 16. It has been found in practice that the vibration damping grommets 21 produce adequate damping in the first path recited above. To attenuate vibration transmission in paths two and four above, the pads 24 are provided. For path three, the vibration damping qualities of the idler wheel 28 are employed.

In paths two, three, and four, it will be noted that there are at least two vibration absorbing members between the source 18 and the disc or turntable 16. This series arrangement of the vibration damping members, plus the further fact that such vibration damping members have different natural periods of vibration produces eminently satisfactory attenuation of vibration transmission.

By the instant invention there has been provided an adjustable speed driving mechanism for a phonograph turntable, in which vibrations from the drive motor are attenuated virtually to the vanishing point by the combination of the vibration damping motor supports 21, idler wheel 28, and supporting pads or discs 24, and the resilient spring 32, all acting together to absorp and damp out vibrations.

In the embodiment described hereinbefore, it has been assumed that the motor 18 is turned on and off by some suitable independent switch means. In practice it is preferred to incorporate the motor switch means into the operation of the actuating lever 34, so that the motor is energized and de-energized automatically with actuation of the idler roller 28. Such a refinement is shown in Figs. 7–11.

Referring to these figures, a slotted member or housing 51, made of non-conducting material is shown secured to the base 12 by a pair of bolt securements 52. Lever 34 is pivotally mounted within the slot 53 of the member 51 by means of a pivot pin 54.

Figure 10:
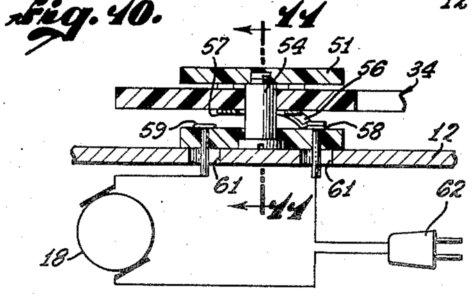
Fig. 10 is a fragmentary section taken on line 10—10 in Fig. 9.

Secured to the underface of the lever 34, circumjacent the pivot pin 54, is a resilient leaf-like conducting contact member having a pair of arcuate arms 56 and 57 adapted to selectively engage and disengage contact pins 58 and 59, respectively. The pins 58 and 59 are embedded in the member 51 and pass through openings 61 in the metal base 12. Contacts 58, 59 are connected in series between motor 18 and plug 62 (Fig. 10).

Figures 7, 8:
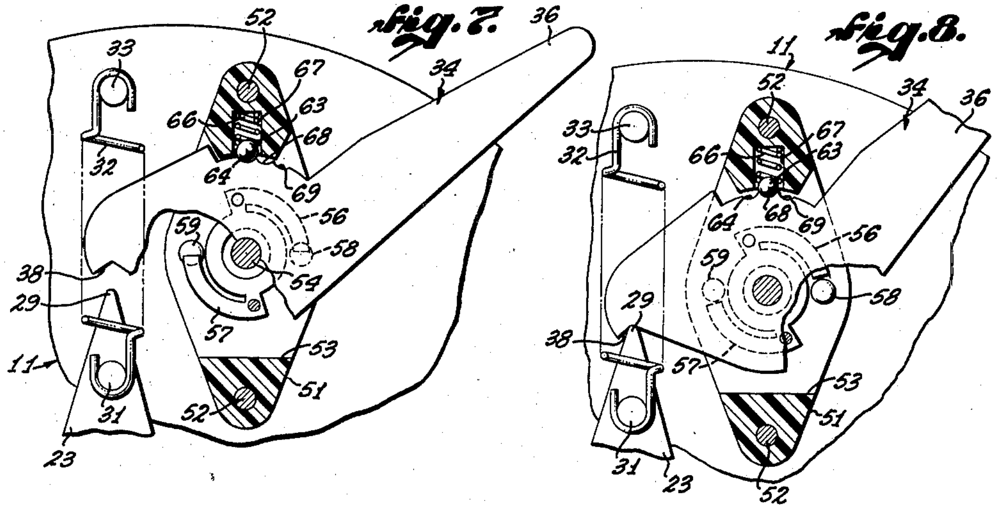
Fig. 7 is a fragmentary plan view partially sectioned illustrating a refinement in the operating lever.
Fig. 8 is a view similar to Fig. 7 showing the lever in an intermediate position of operation.

In Fig. 7 the parts are shown in the position assumed when the turntable 16 is turning, with motor 18 energized and the idler wheel 28 in engaged position. In this position it will be noted that the notch 38 in the lever 34 is spaced from the point 29 of the idler plate 23. It will be further noted that the switch arms 56 and 57 are in engagement with their respective contact terminals 58 and 59, thus completing the motor circuit from the plug 62. The lever 34 is resiliently restrained in this position by the seating of a detent ball 63 in a notch 64 formed in the edge of the lever 34. The ball 63 is pressed into the notch by a spring 66 residing in a socket 67 formed in the member 51.

In Fig. 8, the lever 34 has been shown moved to an intermediate position, wherein the ball 63 resides in an intermediate notch 68 formed adjacent the notch 64. In this position it will be seen that the contact arms 56 and 57 have separated from their respective terminals 58 and 59, thereby opening the circuit and de-energizing the motor. The idler wheel 28 has not been disengaged, however, because in the intermediate position shown in Fig. 8, the notch portion 38 of the lever 34 has been brought only lightly into engagement with the point 29 of the idler plate 23.

Figure 9:
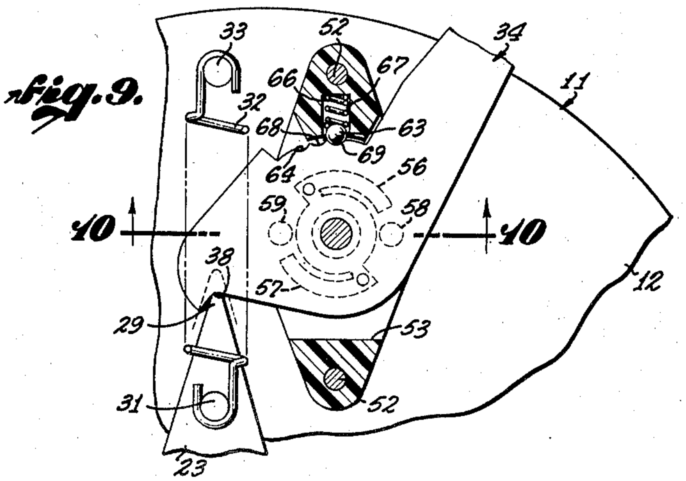
Fig. 9 is a view similar to Fig. 7 showing the operating lever in still another position of operation.
Figure 11:
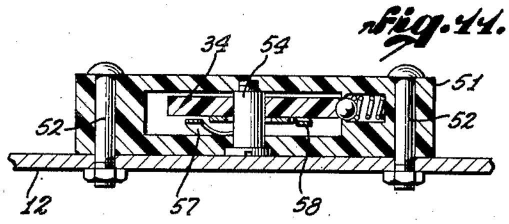
Fig. 11 is a fragmentary section taken on line 11—11 in Fig. 10.

In Fig. 9, the lever 34 has been shown moved to full "off" position, wherein the ball 63 resides in a third notch 69 formed in the edge thereof adjacent the notch 64. In this position the operating end of the lever 36 has fully engaged the idler plate 23 and has pushed the idler wheel 28 out of engagement with the shaft 22 and turntable 16, against the bias of the spring 32. The notch 69 and detent spring 67 are suitably designed so that the lever 34 is able to maintain this position against the force of the spring 32. It will be noted in Fig. 8 that the switch for the motor remains open, because the contact arms 56 and 57 have moved still farther away from their respective contact terminals.

In normal household operation, it is preferred to move the lever between its extreme positions represented by the notches 64 and 69. In this operation both the idler wheel 28 and the motor 18 are operated together. The intermediate position of Fig. 8 is useful where it is desirable that the turntable 16 should be set into motion rapidly and without the slight shock which might be occasioned by the engagement of the idler wheel 28, with the spinning shaft 22. This use is particularly desirable in radio and television broadcasting where speed and absence of background noise are important.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims.

What is claimed is:

1. Drive mechanism comprising a frame including a substantially flat base, a drive cylinder rotatably mounted to said frame, a driven cylinder rotatably mounted to said frame, a carrier member positioned on said base, pliant vibration absorbing means interposed between said carrier member and said base and slidable over said base, an idler wheel rotatably mounted to said carrier member in position to engage said cylinders, and resilient means extending between said carrier member and said frame for resiliently biasing said idler wheel into frictional engagement with said cylinders.

2. Phonograph turntable driving mechanism comprising a substantially flat horizontal base, a record turntable pivotally mounted to said base on a substantially vertical axis, a drive motor beneath said base having a shaft projecting upwardly through said base, vibration damping means mounting said motor to said base thereby to attenuate transmission of vibration from said motor to said base, a generally triangular carrier plate disposed between said turntable and said shaft, vibration absorbing pad means beneath said plate, said plate resting on said base through the intermediacy of said pad means, an idler wheel rotatably mounted to said plate, said turntable being driven from said motor shaft through the intermediacy of said idler wheel, a spring tensioned between said base and one corner of said plate for biasing said wheel into driving position, and a lever pivotally mounted to said base and having a handle portion and a notch portion, the notch in said latter portion engaging said plate corner, whereby said plate may be held in non-engaging position by operation of said lever.

3. Phonograph turntable driving mechanism comprising: a turntable, a drive roller, and an idler wheel all rotatably mounted on spaced, substantially parallel axes, an electric motor connected to rotate said drive roller, a carrier plate movably disposed intermediate said turntable and said driving roller means pivotally mounting said idler wheel to said carrier plate in position to engage said turntable and said drive roller, resilient means biasing said idler wheel into engagement with said turntable and said drive roller, a pivotally mounted lever, notch and point engagement means between said lever and said carrier member, switch means mounted to said lever and pivotable therewith; a stationary contact member selectively engageable and disengageable by said switch means, and electric circuit means connecting said motor to be energized and de-energized through said switch means, whereby, upon pivoting of said lever, said idler wheel is moved out of driving position against the bias of said resilient means, and said switch means is disengaged from said contact member.

4. Phonograph turntable driving mechanism, comprising a turntable having a driving surface, a drive roller, and an idler wheel all rotatably mounted about spaced substantially parallel axes, a carrier plate movably disposed intermediate said driving surface of said turntable and said driving roller, means pivotally mounting said idler wheel to said carrier plate in position to engage said driving surface of said turntable and said drive roller, resilient means biasing said idler wheel into engagement with said driving surface of said turntable and said drive roller, a pivotally mounted lever, and notch-and-point engagement means between said lever and said carrier member for effecting engagement between said lever and said carrier member, whereby upon pivoting of said lever said carrier member is moved out of driving position, against the bias of said resilient means.

5. Phonograph turntable driving mechanism comprising: a frame including a substantially flat, horizontal base, a turntable having a cylindrical flange and rotatably mounted to said frame, a drive roller rotatably mounted to said frame, a plate having a pointed portion and disposed between said flange of said turntable and said roller, pliant pad means beneath said plate, said plate resting on said base through the intermediacy of said pad means, an idler wheel rotatably mounted on said plate, and a spring connected to said plate adjacent said pointed portion and tensioned between said plate and said frame for biasing said idler wheel into frictional engagement with said turntable and said roller, and a disengaging lever pivoted to said frame having a handle portion and a notched operating portion, with the notch being engaged against said pointed portion, whereby upon pivoting of said lever, said plate is moved against the tension of said spring to disengage said idler wheel from said turntable and said drive roller.

6. Drive mechanism comprising a frame including a first member in the form of a substantially flat base, a drive cylinder rotatably mounted to said frame, a driven cylinder rotatably mounted to said frame, a second member in the form of a carrier member positioned on said base, pliant vibration absorbing means interposed between said members and slidable with respect to at least one of said members, an idler wheel rotatably mounted to said carrier member in position to engage said cylinders, and resilient means extending between said carrier member and said frame for resiliently biasing said idler wheel into frictional engagement with said cylinders.

7. Drive mechanism comprising a frame, including a first member in the form of a substantially flat base, a drive cylinder rotatably mounted to said frame, a driven cylinder rotatably mounted to said frame, a second member in the form of a carrier member positioned on said frame, pliant vibration absorbing means interposed between said members and slidable with respect to at least one of said members, an idler wheel rotatably mounted to said carrier member in position to engage said cylinders, resilient means extending between said carrier member and said frame resiliently biasing said idler wheel into frictional engagement with said cylinders, and a manually engageable handle member for moving said carrier member against the bias of said resilient means to selectively disengage said idler wheel from at least one of said cylinders.

References Cited in the file of this patent

UNITED STATES PATENTS

| | | |
|---|---|---|
| 2,161,148 | Erwood | June 6, 1939 |
| 2,392,193 | Schneider | Jan. 1, 1946 |
| 2,467,261 | Hobrough | Apr. 12, 1949 |
| 2,547,666 | Schneider | Apr. 3, 1951 |
| 2,674,131 | Lorusso | Apr. 6, 1954 |
| 2,731,809 | Hackney | Jan. 24, 1956 |

FOREIGN PATENTS

| | | |
|---|---|---|
| 708,567 | Great Britain | May 5, 1954 |